United States Patent
Ishii et al.

(10) Patent No.: US 6,693,761 B2
(45) Date of Patent: Feb. 17, 2004

(54) CONTROL METHOD OF CONTROL MAGNETIC DISK UNIT AND MAGNETIC DISK UNIT USING SUCH METHOD

(75) Inventors: Nobuyuki Ishii, Odawara (JP); Kiyoshi Hashimoto, Odawara (JP); Shinsuke Higuchi, Odawara (JP); Kenichi Gomi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 370 days.

(21) Appl. No.: 09/796,632

(22) Filed: Mar. 2, 2001

(65) Prior Publication Data

US 2001/0022701 A1 Sep. 20, 2001

(30) Foreign Application Priority Data

Mar. 2, 2000 (JP) .......................................... 2000-057147

(51) Int. Cl.⁷ ........................... G11B 21/02; G11B 15/46
(52) U.S. Cl. ..................... 360/75; 360/73.03; 360/236.3
(58) Field of Search ................................ 360/75, 73.03, 360/122, 234.3, 235.5, 235.4, 235.8, 235.9, 236.3, 236.6, 236.7, 237, 237.1, 254

(56) References Cited

U.S. PATENT DOCUMENTS

| | | | | |
|---|---|---|---|---|
| 5,870,250 A | * | 2/1999 | Bolasna et al. | 360/236.8 |
| 6,034,842 A | * | 3/2000 | Cha | 360/235.6 |
| 6,243,222 B1 | * | 6/2001 | Boutaghou et al. | 360/73.03 |
| 6,344,949 B1 | * | 2/2002 | Albrecht et al. | 360/236.5 |
| 6,356,412 B1 | * | 3/2002 | Levi et al. | 360/237 |
| 6,385,011 B1 | * | 5/2002 | Chang et al. | 360/234.3 |
| 6,483,667 B1 | * | 11/2002 | Berg et al. | 360/235.6 |
| 6,490,135 B1 | * | 12/2002 | Sannino et al. | 360/235.8 |

FOREIGN PATENT DOCUMENTS

| | | |
|---|---|---|
| JP | 6-203503 | 7/1994 |
| JP | 10-0500200 | 2/1998 |

* cited by examiner

Primary Examiner—Andrew L. Sniezek
(74) Attorney, Agent, or Firm—Antonelli, Terry, Stout & Kraus, LLP

(57) ABSTRACT

In a magnetic disk unit, in the control of a load/unload function of a magnetic head relative to a magnetic disk, the magnetic disk and the magnetic head are prevented from contacting each other and damage thereto is avoided by utilizing a shallow dual-step subambient pressure slider and carrying out loading/unloading at a rotational speed lower than a rated rotational speed of the normally operated magnetic disk at which writing and reading (R/W) of data to and from the magnetic disk by the magnetic head is normally carried out.

24 Claims, 9 Drawing Sheets

| RPM | load/unload | disk/head contact | |
|---|---|---|---|
| 500RPM | NG | yes | out of scope of invention |
| 1000RPM | OK | no | within scope of invention |
| 3000RPM | OK | no | within scope of invention |
| 5000RPM or more | OK | yes | out of scope of invention | shallow dual-step subambient (a)

(b)

(C)

flying characterization control while height from deep recess surface to shallow recess surface will be changed subambient pressure slider (a)

(b)

(c)

CONTROL METHOD OF CONTROL MAGNETIC DISK UNIT AND MAGNETIC DISK UNIT USING SUCH METHOD

BACKGROUND OF THE INVENTION

The present invention relates to a method for the control of a magnetic disk unit and to a magnetic disk unit using such a method. Specifically, it relates to a technique which can be effectively applied to the control of a magnetic disk unit having a load/unload system.

In recent years, magnetic disk units have been designed to have a higher recording density and less surface roughness, and the flying heights of magnetic heads are getting lower. Therefore, in a conventional magnetic disk unit of the contact-start-stop type, wherein a magnetic head stays on a magnetic disk when the rotation of the magnetic disk is stopped, adsorption (sticking) is apt to occur between the magnetic disk and the magnetic head, which sometimes makes it difficult to start up the magnetic disk.

As one of the solutions for this technical problem, a system called a load/unload system has been developed, in which the magnetic head is loaded on and unloaded from the magnetic disk in a controlled manner. When the magnetic disk is stopped, this system keeps the magnetic head away from the magnetic disk (unloaded state). Further, when the disk is rotating so as to write and read data, the system places (loads) the magnetic head at a position above the magnetic disk so as to be in a flying state.

Now, a typical example of a load/unload operation of a load/unload system will be described.

First, a load operation of the load/unload system will be described. When the unit is stopped, the magnetic head is in a retreated state located away from the magnetic disk and is supported by a lift tab attached to the magnetic head moves on a ramp (sloping path). When the unit is turned on, the rotation of the magnetic disk is started by a spindle motor. When the rated rotational speed has been reached, the magnetic head is displaced laterally from its retreated state and descends the ramp while being guided by the lift tab and takes a position (loaded) above the magnetic disk so as to be in a flying state.

Next, an unload operation will be described. During the disk rotation, when an instruction to stop the unit is issued, the magnetic head, which is disposed at a flying position above the magnetic disk, is guided laterally to a point where the lift tab is caused to slide along the ramp, through a moving action of an actuator, thereby to ascend the ramp, causing it to be displaced from the magnetic disk, after which the motor is stopped.

Now, a subambient pressure slider in the magnetic disk will be described. The subambient pressure slider has a positive-pressure generating portion and a negative-pressure generating portion on a flying surface opposing the magnetic disk. Further, it flies above the disk according to a proper balance between itself and the load.

When unloading, the lift tab runs onto the ramp so that the magnetic head tends to be held at a position away from the magnetic disk. At this time, since a negative-pressure portion exists in part of the flying surface of the slider, a reactive force in the direction of attracting the slider to the surface of the magnetic disk is produced to break the flying posture. Further, in the course of unloading, before he left tab of the magnetic head runs onto the ramp, the magnetic head collides with the magnetic disk, thereby increasing the possibility of causing abrasion and damage to the magnetic disk and the magnetic head, which has been a problem to be solved technically.

Further, to reduce the data-access time, when using a 3.5-inch magnetic disk unit at a rotational speed higher than 10,000 rpm, instead of a conventional 2.5-inch magnetic disk unit at 4,200 rpm, the impact of the collision between the magnetic head and the magnetic disk is intensified, thereby increasing the possibility of causing abrasion and damage to the magnetic disk and the magnetic head when they contact each other.

The solution to the problem of avoiding damage when loading and unloading may be to decrease the moving speed of the magnetic head. However, this brings about another technical problem, such as prolongation of the time for loading and unloading.

SUMMARY OF THE INVENTION

It is an object of the present invention to provide a magnetic disk unit in which damage to a magnetic head and a magnetic disk, etc. caused by contact or collision therebetween during a load/unload operation is reduced, as well as a control technique therefor.

In a method of control of a magnetic disk unit, which comprises a magnetic disk, a head for writing and reading data to and from the magnetic disk, an actuator positioning the head on the magnetic disk, and a load/unload system for unloading the head by moving the head away from the magnetic disk and for loading the head by bringing the head on the magnetic disk, at least either loading or unloading is carried out at a second rotational speed, which is lower than a first rotational speed at which writing and reading to and from the magnetic disk by the head are carried out.

Also, according to the present invention, in a method of control of a magnetic disk unit, which comprises a magnetic disk, a head for writing and reading data to and from the magnetic disk, an actuator for positioning the head on the magnetic disk, a load/unload system for unloading the head by taking the head away from the magnetic disk and for loading the head by bringing the head on the magnetic disk, a control logic is provided which executes at least either loading or unloading at a second rotational speed, which is lower than a first rotational speed at which writing and reading to and from the magnetic disk by the head is carried out.

More specifically, as an example, the rotational speed of the magnetic disk when loading/unloading the head is set to be a half to one-tenth of the rotational speed used for a usual R/W operation. Further, as a head slider making up part of the magnetic head, a shallow dual-step subambient pressure slider is used, whose flying height gets higher as a result of the lower disk rotational speed during loading/unloading. Also, the upper limit of the moving speed of the magnetic head during loading/unloading is set to be 0.1 m/s.

BRIEF DESCRIPTION OF THE DRAWINGS

The accompanying drawings, which are incorporated in and constitute a part of the disclosure of the invention, illustrate embodiments of the invention and, together with the description, serve to explain the principles of the invention.

DESCRIPTION OF THE PREFERRED EMBODIMENT

With reference to the drawings, an embodiment of the present invention will be described in detail.

Figure 5:
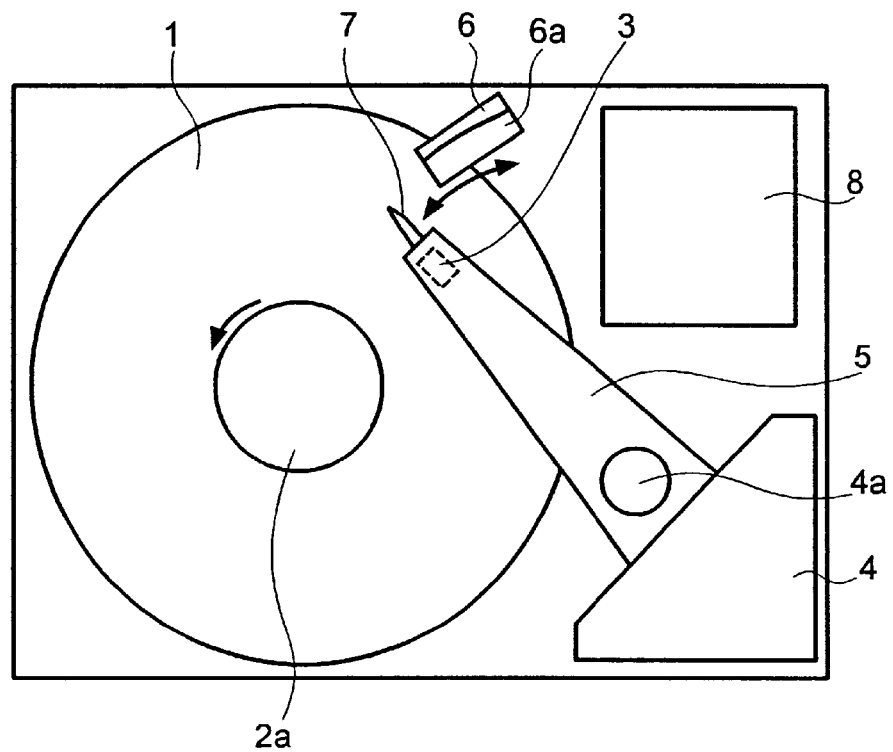
FIG. 5 is a schematic plan view showing an example of the internal structure of a magnetic disk unit in which a control method of the magnetic disk unit according to one embodiment of the invention is implemented.
Figure 6:
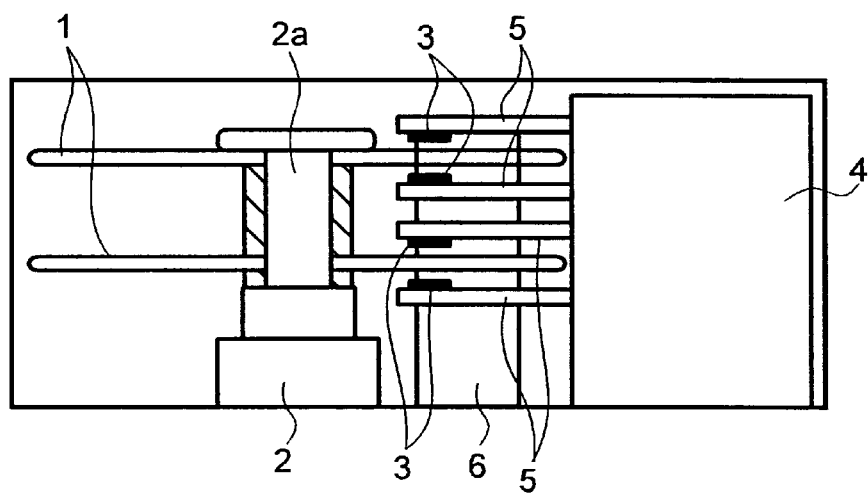
FIG. 6 is a schematic section view showing an example of the internal structure of a magnetic disk unit in which a control method of the magnetic disk unit according to one embodiment of the invention is implemented.

FIG. 5 is a schematic plan view showing an example of an internal structure of the magnetic disk unit in which the control method of the magnetic disk unit according to one embodiment of the present invention is implemented; and FIG. 6 is its schematic cross section.

The magnetic disk unit according to the present embodiment shown in FIGS. 5 and 6 comprises a magnetic disk 1 for recording data, a spindle 2a supporting the magnetic disk 1, a motor 2 for rotating the magnetic disk 1 through the spindle 2a, a magnetic head 3 for writing and reading data to and from the magnetic disk 1, an actuator system 4, such as a voice coil motor, for controlling the positioning of the magnetic head 3 with respect to the magnetic disk 1 through a suspension 5 rotating about a pivot shaft 4a in a plane parallel to the magnetic disk 1, and a load/unload system for mechanically separating the magnetic head 3 from the magnetic disk 1 when unloading. The load/unload system comprises a lift tab 7 fixed on the side of the magnetic head 3 and a ramp 6 provided outside of the magnetic disk 1, within the rotating range of the lift tab 7 and having a sloping contact surface 6a on which the lift tab 7 slides.

Further, the magnetic disk unit of the present embodiment has a unit control section 8 for controlling rotation of the magnetic disk 1 by the motor 2, as well as detection of the rotating condition, positioning of the magnetic head 3 and a load/unload operation by the actuator system 4, operation by the magnetic head 3, and sending and receiving data to and from host devices, not shown, etc.

The magnetic disk 1 is rotated by the motor 2, the actuator system 4 is activated by the load/unload operation to load the magnetic head 3 on the magnetic disk 1, and the loading status is achieved by a load spring 5 biased in the direction to press the magnetic head 3 against the magnetic disk 1. During the unload operation, the actuator system 4 functions so as to move the magnetic head 3 and the lift tab 7 laterally toward the outside of the magnetic disk 1 to unload the magnetic head 3, and, in such case, the lift tab 7 runs onto the ramp 6 so as to oppose the bias force of the load spring 5, achieving the unloaded status.

Figure 10:
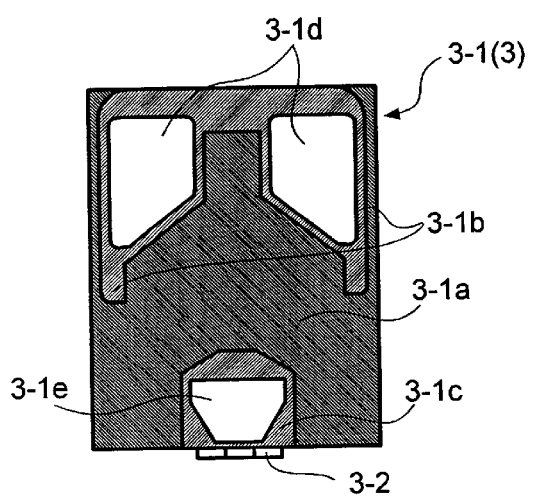
FIG. 10A is a plan view.
FIGS. 10B and 10C are perspective views, respectively, showing an example of a structure of a shallow dual-step subambient pressure slider of the type used in a magnetic disk unit in which a control method of the magnetic disk unit according to one embodiment of the invention is implemented.
Figure 10:
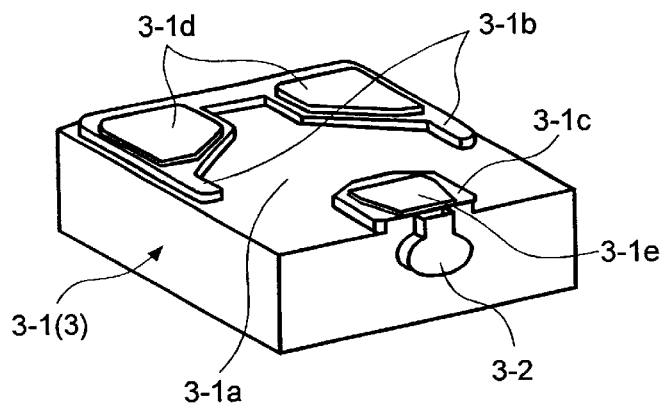
Figure 10:
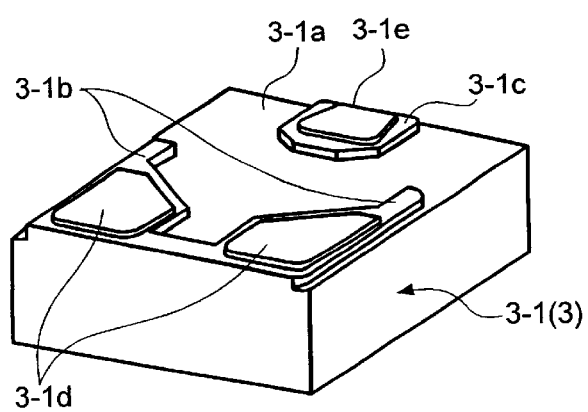

According to the present embodiment, the magnetic head 3 comprises a shallow dual-step subambient pressure slider 3-1, having a structure as shown in FIGS. 10A to 10C, and a combined head 3-2, which is supported by a portion of the shallow dual-step subambient pressure slider 3-1, and comprises, for example, a thin-film coil recording head and a reproducing head including a magnetoresistance-effect element.

Figure 7:
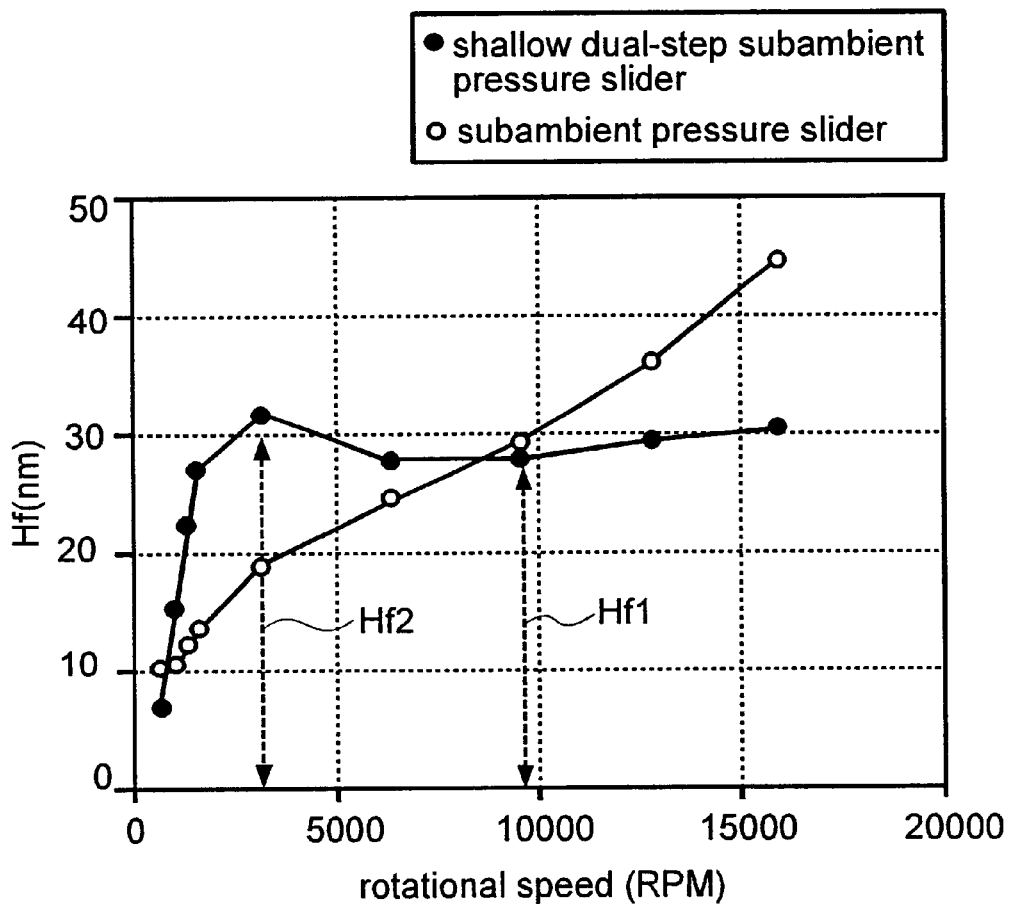
FIG. 7A is a graph showing an interrelationship of a flying height of a slider making up part of a magnetic head versus disk (magnetic disk) rotational speed.
FIG. 7B is a chart comparing effects of a shallow dual-step subambient pressure slider according to an embodiment of the invention and a related art.

FIG. 7A is a graph showing the interrelation between the flying height of a slider making up part of the magnetic head and the disk (magnetic disk) rotational speed. The vertical axis shows the flying height of the slider and the horizontal axis shows the disk rotational speed.

Figure 12:
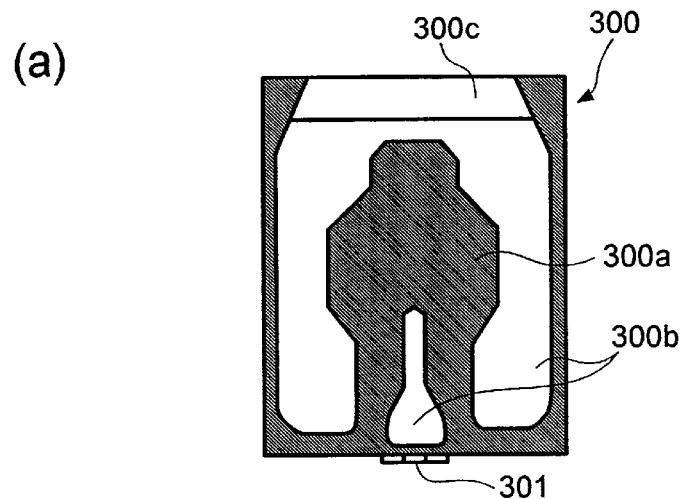
FIG. 12A is a plan view.
FIGS. 12B and 12C are perspective views, respectively, showing a subambient pressure slider according to related art.
Figure 12:
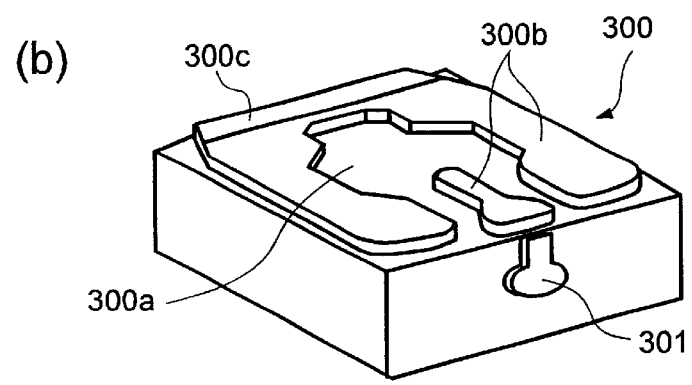
Figure 12:
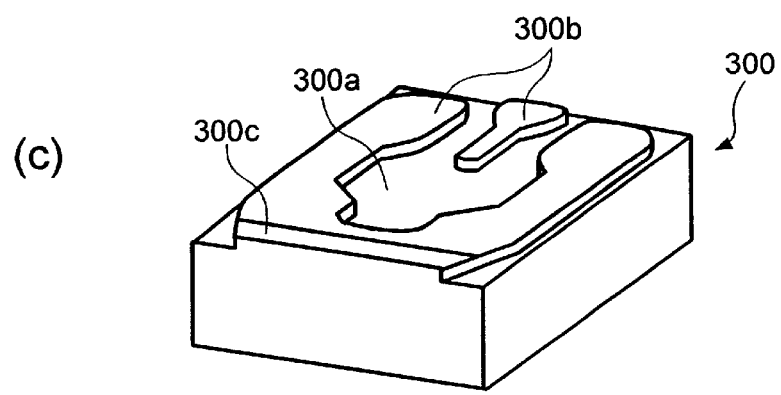

Now, the slider will be described in more detail. FIGS. 12A to 12C show a subambient pressure slider 300 according to related art. In this subambient pressure slider 300, a plurality of rail-like pads 300b is provided so as to longitudinally extend on a flying surface 300a opposing the magnetic disk, and a tapered portion 300c is formed on the inflow-end side of an airflow produced by the rotation of the magnetic disk. Also, a combined head 301 is positioned at the end face on the other side of the tapered portion 300c. Such a structured subambient pressure slider 300 has the characteristic that the flying height Hf of the head rises as the rotational speed of the magnetic disk 1 gets higher.

On the other hand, a shallow-dual step subambient pressure slider 3-1 of the present embodiment, as shown in FIGS. 10A to 10C has such a structure that rail portions 3-1b, 3-1c, and pad portions 3-1d, 3-1e on each of the rail portions 3-1b, 3-1c are formed in a multi-stepped manner on the flying surface 3-1a opposing the magnetic disk 1. Also, the above-described combined head 3-2 is positioned on the rail portion 3-1c on the outflow-end side of the airflow produced by the rotation of the magnetic disk 1 and on an end face of the pad portion 3-1e.

Figure 11:
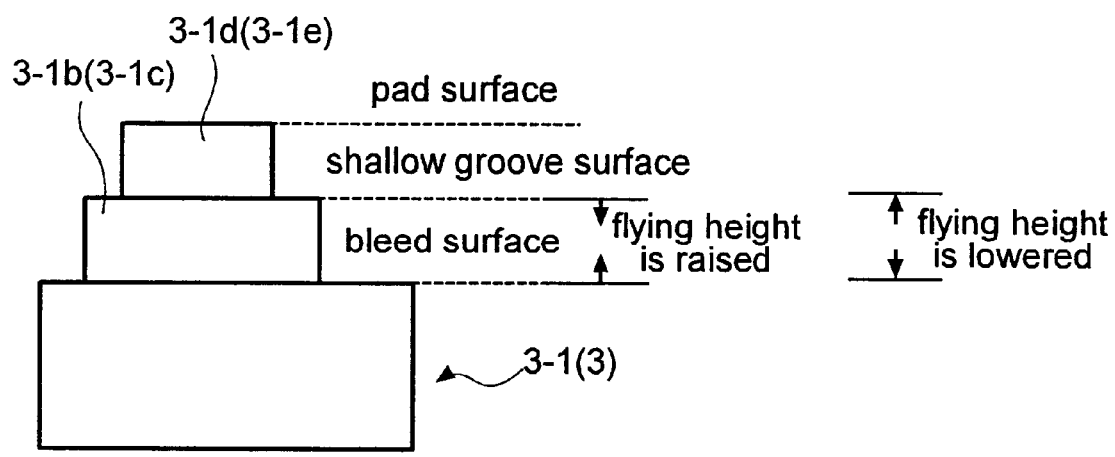
FIG. 11 is a diagram showing an example of the operation of a shallow dual-step subambient pressure slider used in a magnetic disk unit in which a control method of the magnetic disk unit according to one embodiment of the invention is implemented.

FIG. 11 is a schematic cross section of a shallow dual-step subambient pressure slider 3-1. According to the slider 3-1, flying characteristics, such as the flying height, are controlled by adjusting the heights of an upper surface (shallow groove surface) of the rail portions 3-1b, 3-1c and an upper surface (pad surface) of the pad portions 3-1d, 3-1e with respect to the bottom (bleed surface) of the deepest groove in the periphery of the rail portions 3-1b, 3-1c. For example, as shown in FIG. 11, the flying height Hf of the shallow dual-step subambient pressure slider 3-1 becomes higher (lower) as the distance between the bleed surface and the shallow groove surface gets shorter (longer).

In the case of the shallow dual-step subambient pressure slider 3-1 of the present embodiment, in which the tapered portion 300c of the subambient pressure slider 300 of the related art in FIGS. 12A to 12C is removed, as described, the following flying height characteristic is obtained by changing the shapes of the rail portions 3-1b, 3-1c of the slider. Namely, the flying height of the magnetic head 3 is lowered (reaches a first flying height Hf1) as the rotational speed of the magnetic disk 1 gets higher. On the contrary, when the rotational speed of the magnetic disk 1 is lowered, the flying height of the magnetic head 3 is raised (reaches a second flying height Hf2). By making use of such a flying characteristic of the shallow dual-step subambient pressure slider 3-1, as shown in FIG. 7B, in comparison with the subambient pressure slider 300 of the related art, an effect of reducing the contact shock between the magnetic disk 1 and the magnetic head 3 during loading/unloading is obtained, thereby avoiding damage thereto.

Further, as shown in FIG. 7A, one of the characteristics of the shallow dual-step subambient pressure slider 3-1 making up part of the magnetic head 3 of the present embodiment is that the flying height does not vary much and stays at Hf1 after a given rotational speed is achieved.

Now, the lubricant film thickness of the disk will be described. By its nature, lubricant of a disk serves to avoid damage caused by contact and abrasion between the magnetic disk 1 and the magnetic head 3 while the magnetic disk 1 is rotating. When loading/unloading, however, it must not be too thick so as to avoid contact caused by loading/unloading as much as possible. However, with too little lubricant, it becomes impossible to avoid damage caused by contact and abrasion between the magnetic disk 1 and the magnetic head 3 while the magnetic disk 1 is rotating. In view of the foregoing consideration, the most appropriate lubricant film thickness for loading/unloading is at most 25 Å and at least 8 Å.

Now, the surface roughness of the disk will be described. When loading and/or unloading, what serves most effectively to avoid abrasion of and damage to the magnetic disk 1 and the magnetic head 3 is the distance between them during a load/unload operation. Therefore, the difference between the surface roughness of the disks can also reduce damage if they are kept as small as possible. Accordingly, a surface roughness of Ra 0.4 nm and Rp 0.8 nm, for example, is preferable for effectively utilizing the magnetic disk 1.

Now, the moving speed of the magnetic head 3 will be described. During loading/unloading, particularly at a time of unloading, when a shallow dual-step subambient pressure slider 3-1 such as the present embodiment is adopted, a suction force is produced between the rotating magnetic disk 1 and the magnetic head 3 on the magnetic disk 1 by a negative-pressure characteristic of the shallow dual-step subambient pressure slider 3-1. In an attempt to separate the magnetic head 3 in this state from the magnetic disk 1, a lift tab 7 on a tip end of a load spring 5 runs onto a sloping contact surface 6a of a ramp 6 and serves to separate the magnetic head 3 from the magnetic disk 1. At the moment of separation, the magnetic disk 1 and the magnetic head 3 come into contact with each other. In particular, the higher the moving speed of the magnetic head 3 gets, the stronger the contacting force grows. Thus, abrasion and damage are easily brought about. On the contrary, the lower the moving speed is, the weaker the contacting force becomes, whereby abrasion and damage are not easily brought about. Also, when loading, the higher the moving speed of the magnetic head 3 is, the more likely it is for the magnetic head 3 to contact the magnetic disk 1 the moment it is loaded on the magnetic disk 1. On the contrary, the lower the moving speed of the magnetic head 3 is, the less likely it is for the magnetic head 3 to contact the magnetic disk 1. In view of the above, it is most preferable for the moving speed of the magnetic head 3 to be 0.1 m/s at the highest.

Figures 8, 9:
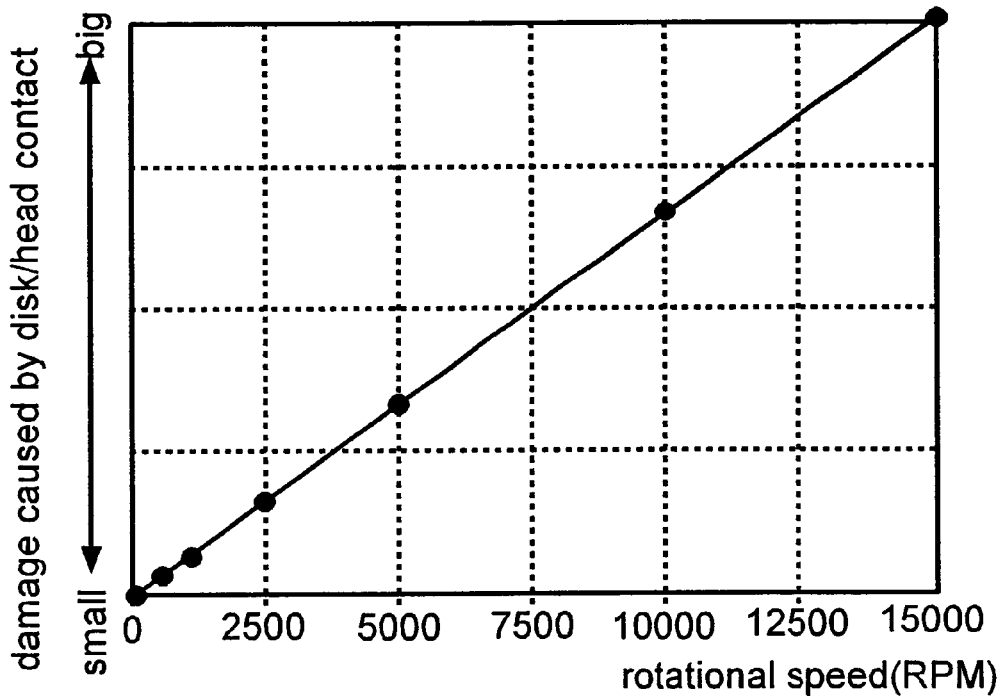
FIG. 8 is a graph illustrating an interrelationship between magnetic-disk rotational speed and an incidence of damage caused by the contact between the head and the magnetic disk.
FIG. 9 is a chart showing an example of working effects of a magnetic disk unit in which a control method of the magnetic disk unit according to one embodiment of the present invention is implemented.

Next, rotational speeds of the magnetic disk 1 and damage caused by contact between the magnetic disk 1 and the magnetic head 3 when loading/unloading will be discussed. FIG. 8 shows a graph in which disk rotational speed is plotted along the horizontal axis and damage caused by the contact between the head and the disk is plotted along the vertical axis.

Figure 1:
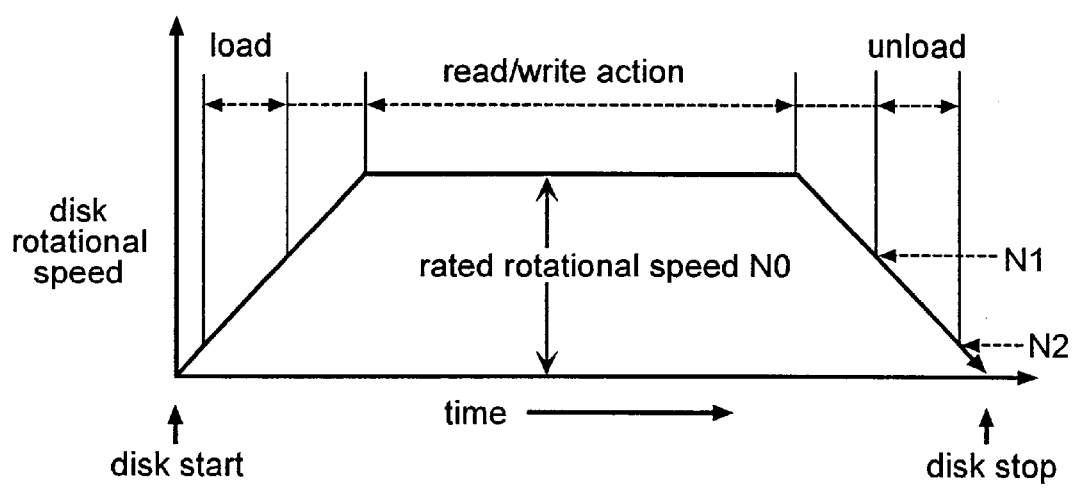
FIG. 1 is a diagram showing a method of control of a magnetic disk unit according to one embodiment of the invention and an example of the operation of the magnetic disk.

Now, the contact between the magnetic disk 1 and the magnetic head 3 when loading/unloading will be described. When loading/unloading, the magnetic disk 1 and the magnetic head 3 come into contact with each other. Further, damage to the magnetic disk 1 and the magnetic head 3 gets greater as the rotational speed of the magnetic disk 1 gets higher. Therefore, according to the present invention, as shown in FIG. 1, at least either loading or unloading is carried out within the range between the rotational speed N1 (N0/2, for example), which is lower than the rated rotational speed N0 at which R/W of data to and from the magnetic disk 1 by the magnetic head 3 is carried out, and N2 (N0/10, for example). For illustrative reasons, in FIG. 1, the case wherein both the loading and unloading are carried out at rotational speeds N1–N2, which are lower than the rated rotational speed N0, is shown. However, either unloading or loading alone can be carried out at the rotational speeds N1–N2, which are lower than the rated rotational speed N0.

Figure 2:
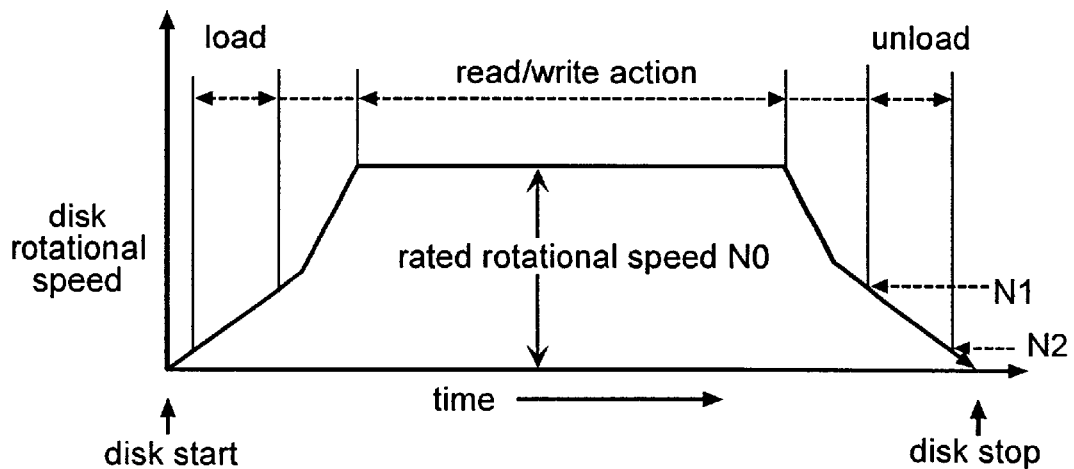
FIG. 2 is a diagram showing a method of control of a magnetic disk unit according to one embodiment of the invention and another example of the operation of the magnetic disk.

Further, as illustrated in FIG. 2, the rotational rate of acceleration or rotational rate of deceleration in the course of acceleration or deceleration of the magnetic disk 1 when being loaded or unloaded may be selectively lowered. Or, as illustrated in FIG. 3, the rotational speed of the magnetic disk 1 may be set at a predetermined constant rotational speed N3 (=N–N2) before reaching the rated rotational speed N0, and loading/unloading may be carried out in that state.

In accordance with the increase of the rotational speed of the magnetic disk 1, as shown in FIG. 7A, the flying height Hf of the subambient pressure slider 300 of the related art gradually increases. Therefore, for example, when rotating the magnetic disk 1 at a high speed of 10,000 rpm or more, it becomes difficult to achieve the objective low flying height and it cannot be helped but to use the shallow dual-step subambient pressure slider 3-1. In the present embodiment, however, loading/unloading are carried out at rotational speeds N–N2, which are lower than the rated rotational speed N0 at the rated flying height Hf1. Namely, the loading/unloading are carried out at a higher flying height Hf2, which more effectively prevents the magnetic disk 1 and the magnetic head 3 from colliding with each other.

Thus, in a high-speed magnetic disk unit in which the shallow dual-step subambient pressure slider 3-1 has to be used, the magnetic disk 1 and the magnetic head 3 are more effectively prevented from being damaged.

Figure 3:
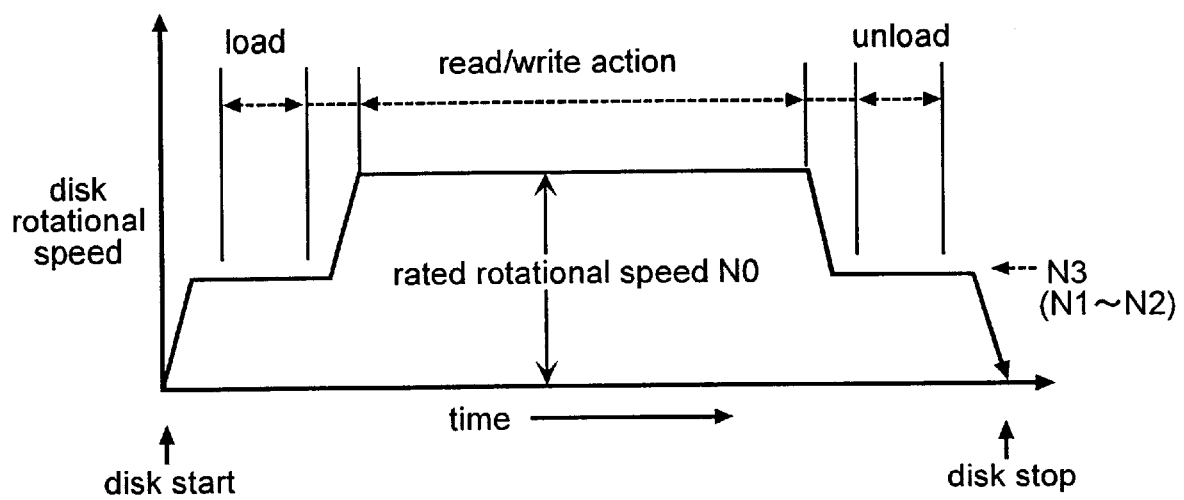
FIG. 3 is a diagram showing a method of control of a magnetic disk unit according to one embodiment of the invention and another example of the operation of the magnetic disk.
Figure 4:
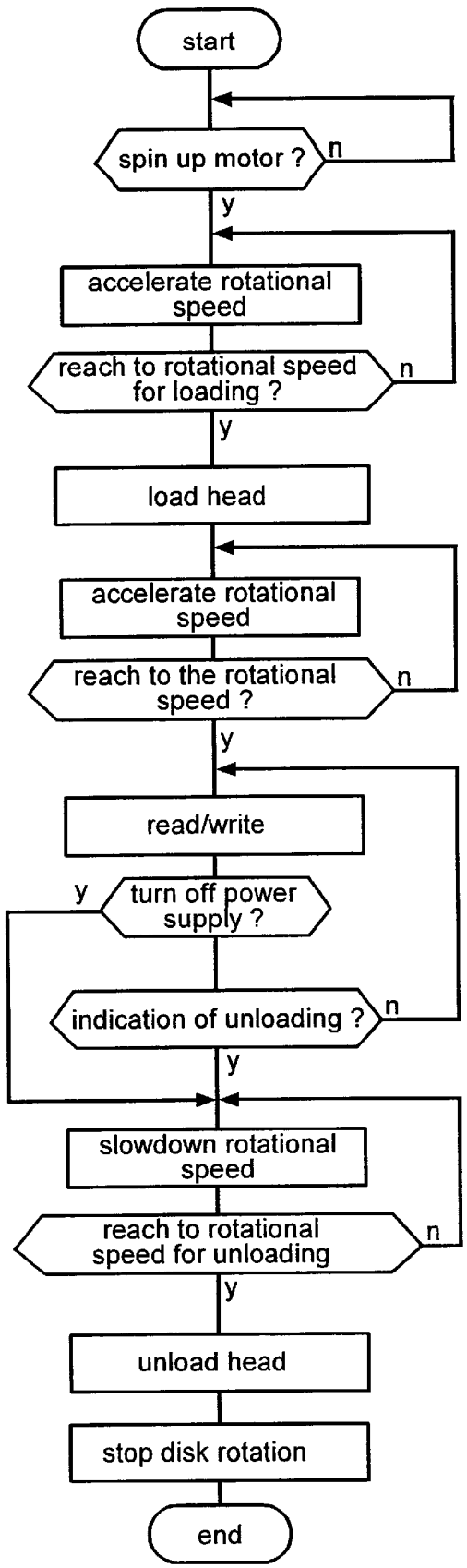
FIG. 4 is a flowchart showing a method of control of a magnetic disk unit according to one embodiment of the invention and an example of the operation of the magnetic disk.

The control of the timing of loading/unloading according to the rotational speed of the magnetic disk 1, as illustrated in FIGS. 1 to 3, can be carried out by control software or firmware installed in the unit control section 8 for controlling loading/unloading operations. FIG. 4 shows a flowchart of an example of the control operation by the control software and firmware, with which control the timing of loading/unloading in accordance with the rotational speed of the magnetic disk 1 is carried out.

FIG. 9 shows an example of measured results obtained in checking for the occurrence of contact between the magnetic disk 1 (disk) and the magnetic head 3 when loading/unloading at various rotational speeds of the magnetic disk 1. As the rotational speed of the magnetic disk 1 gets higher, damage to the magnetic disk 1 and the magnetic head 3 gets greater. On the other hand, the magnetic disk 1 and the magnetic head 3 are subjected to greater damage as well when the rotational speed is too low to load and/or unload.

In view of the above, to reduce the impact of a collision between the magnetic disk 1 and the magnetic head 3 and prevent damage to them, it is preferable to load and/or unload at rotational speeds N1–N2, which are a half to one-tenth of the conventional rated rotational speed N0 of the magnetic disk.

As described above, in the magnetic disk unit and its control method according to the present embodiment, contact between the magnetic disk 1 and the magnetic head 3 during loading/unloading is prevented and, further, damage to the magnetic disk 1 and the magnetic head 3 is avoided. In other words, it is possible to raise the moving speed of the magnetic head 3 at loading/unloading and to shorten the required time for loading/unloading without being concerned with the occurrence of damage to the magnetic disk 1 and the magnetic head 3. Further, the reliability of the magnetic disk unit can be improved as well.

The invention has been specifically described in accordance with a preferred embodiment. The present invention, however, is not limited to the above embodiment, and it is needless to say that it can be altered variously without departing from the spirit of the invention.

According to the control method of the magnetic disk unit of the present invention, an effect to reduce damage to the magnetic head and the magnetic disk, etc. due to contact and collision during loading/unloading can be obtained.

According to the magnetic disk unit of the present invention, an effect to reduce damage to the magnetic head and the magnetic disk, etc. due to contact and collision during loading/unloading can be obtained.

The present invention is not limited to the above embodiments and various changes and modifications can be made within the spirit and scope of the present invention. Therefore, to appraise the public of the scope of the present invention, the following claims are made.

What is claimed is:

1. A control method of a magnetic disk unit, the magnetic disk unit comprising: a magnetic disk, a head to write and read data to and from the magnetic disk, an actuator to position the head on the magnetic disk, and a load/unload system to unload by taking the head away from the magnetic disk and to load by bringing the head to oppose the magnetic disk;

wherein the head comprises a subambient pressure slider having two rail portions on each side of the slider and pad portions on each of the rail portions, the head having a flying characteristic in which a second flying height (Hf2) above the magnetic disk at the second rotational speed is higher than a first flying height (Hf1) above the magnetic disk at the first rotational speed, and wherein at least either loading or unloading is carried out at the second rotational speed which is lower than the first rotational speed at which writing and reading data to and from the magnetic disk by the head is carried out.

2. A control method of the magnetic disk unit according to claim 1, wherein the second rotational speed is a half to one-tenth of the first rotational speed.

3. A control method of the magnetic disk unit according to claim 1, wherein the head comprises a shallow dual-step subambient pressure slider.

4. A control method of the magnetic disk unit according to claim 1, wherein the magnetic disk is rotated substantially at the first rotational speed during non-unload/load operations and non-write/read operations.

5. A magnetic disk unit comprising: a magnetic disk, a head to write and read data to and from the magnetic disk, an actuator to position the head on the magnetic disk, and a load/unload system to unload by taking the head away from the magnetic disk and to load by bringing the head to oppose the magnetic disk;

wherein the head comprises a subambient pressure slider having two rail portions on each side of the slider and pad portions on each of the rail portions, the head having a flying characteristic in which a second flying height (Hf2) above the magnetic disk at the second rotational speed is higher than a first flying height (Hf1) above the magnetic disk at the first rotational speed, and wherein a control logic is provided so as to execute at least either loading or unloading at the second rotational speed which is lower than the first rotational speed at which writing and reading data to and from the magnetic disk by the head is carried out.

6. A magnetic disk unit according to claim 5, wherein the second rotational speed is a half to one-tenth of the first rotational speed.

7. A magnetic disk unit according to claim 5, wherein the head comprises a shallow dual-step subambient pressure slider.

8. A magnetic disk unit according to claim 5, wherein the magnetic disk is rotated substantially at the first rotational speed during non-unload/load operations and non-write/read operations.

9. A control method of a magnetic disk unit, the magnetic disk unit comprising: a magnetic disk, head means for writing and reading data to and from the magnetic disk, an actuator to position the head on the magnetic disk, and load/unload means for unloading by taking the head away from the magnetic disk and for loading by bringing the head to oppose the magnetic disk;

wherein the head means comprises subambient pressure slider means having two rail portions on each side of the slider and pad portions on each of the rail portions, the head means having a flying characteristic in which a second flying height (Hf2) above the magnetic disk at the second rotational speed is higher than a first flying height (Hf1) above the magnetic disk at the first rotational speed, and wherein at least either loading or unloading is carried out at the second rotational speed which is lower than the first rotational speed at which writing and reading data to and from the magnetic disk by the head is carried out.

10. A control method of the magnetic disk unit according to claim 9, wherein the second rotational speed is a half to one-tenth of the first rotational speed.

11. A control method of the magnetic disk unit according to claim 9, wherein the head means comprises a shallow dual-step subambient pressure slider means.

12. A control method of the magnetic disk unit according to claim 9, wherein the magnetic disk is rotated substantially at the first rotational speed during non-unload/load operations and non-write/read operations.

13. A magnetic disk unit comprising: a magnetic disk, head means for writing and reading data to and from the magnetic disk, an actuator to position the head on the magnetic disk, and load/unload means for unloading by taking the head away from the magnetic disk and for loading by bringing the head to oppose the magnetic disk;

wherein the head means comprises subambient pressure slider means having two rail portions on each side of the slider and pad portions on each of the rail portions, the head means having a flying characteristic in which a second flying height (Hf2) above the magnetic disk at the second rotational speed is higher than a first flying height (Hf1) above the magnetic disk at the first rotational speed, and and control logic means for executing at least either loading or unloading at the second rotational speed which is lower than the first rotational speed at which writing and reading data to and from the magnetic disk by the head is carried out.

14. A magnetic disk unit according to claim 13, wherein the second rotational speed is a half to one-tenth of the first rotational speed.

15. A magnetic disk unit according to claim 13, wherein the head means comprises a shallow dual-step subambient pressure slider means.

16. A magnetic disk unit according to claim 13, wherein the magnetic disk is rotated substantially at the first rotational speed during non-unload/load operations and non-write/read operations.

17. A control method of an electronic system comprising a magnetic disk unit, the magnetic disk unit including: a magnetic disk, a head to write and read data to and from the magnetic disk, an actuator to position the head on the magnetic disk, and a load/unload system to unload by taking the head away from the magnetic disk and to load by bringing the head to oppose the magnetic disk;

wherein the head comprises a subambient pressure slider having two rail portions on each side of the slider and pad portions on each of the rail portions, the head having a flying characteristic in which a second flying height (Hf2) above the magnetic disk at the second rotational speed is higher than a first flying height (Hf1) above the magnetic disk at the first rotational speed, and wherein at least either loading or unloading is carried out at the second rotational speed which is lower than the first rotational speed at which writing and reading data to and from the magnetic disk by the head is carried out.

18. A control method of the electronic system according to claim 17, wherein the second rotational speed is a half to one-tenth of the first rotational speed.

19. A control method of the electronic system according to claim 17, wherein the head comprises a shallow dual-step subambient pressure slider.

20. A control method of the electronic system according to claim 17, wherein the magnetic disk is rotated substantially at the first rotational speed during non-unload/load operations and non-write/read operations.

21. An electronic system comprising:

a magnetic disk unit having: a magnetic disk, a head to write and read data to and from the magnetic disk, an actuator to position the head on the magnetic disk, and a load/unload system to unload by taking the head away from the magnetic disk and to load by bringing the head to oppose the magnetic disk;

wherein the head comprises a subambient pressure slider having two rail portions on each side of the slider and pad portions on each of the rail portions, the head having a flying characteristic in which a second flying height (Hf2) above the magnetic disk at the second rotational speed is higher than a first flying height (Hf1) above the magnetic disk at the first rotational speed, and wherein a control logic is provided so as to execute at least either loading or unloading at the second rotational speed which is lower than the first rotational speed at which writing and reading data to and from the magnetic disk by the head is carried out.

22. An electronic system according to claim 21, wherein the second rotational speed is a half to one-tenth of the first rotational speed.

23. An electronic system according to claim 21, wherein the head comprises a shallow dual-step subambient pressure slider.

24. An electronic system according to claim 21, wherein the magnetic disk is rotated substantially at the first rotational speed during non-unload/load operations and non-write/read operations.

* * * * *